US011909510B2

(12) United States Patent
Lanneer et al.

(10) Patent No.: US 11,909,510 B2
(45) Date of Patent: Feb. 20, 2024

(54) DISCONTINUOUS TIME-FREQUENCY OPERATION

(71) Applicant: Nokia Solutions and Networks Oy, Espoo (FI)

(72) Inventors: Wouter Lanneer, Kessel-Lo (BE); Paschalis Tsiaflakis, Schriek (BE)

(73) Assignee: Nokia Solutions and Networks Oy, Espoo (FI)

(*) Notice: Subject to any disclaimer, the term of this patent is extended or adjusted under 35 U.S.C. 154(b) by 553 days.

(21) Appl. No.: 17/142,994

(22) Filed: Jan. 6, 2021

(65) Prior Publication Data

US 2021/0242952 A1    Aug. 5, 2021

(30) Foreign Application Priority Data

Jan. 31, 2020    (EP) .................................... 20154975

(51) Int. Cl.
*H04J 1/12*    (2006.01)
*H04J 11/00*    (2006.01)

(52) U.S. Cl.
CPC ................. *H04J 1/12* (2013.01); *H04J 11/00* (2013.01)

(58) Field of Classification Search
None
See application file for complete search history.

(56) References Cited

U.S. PATENT DOCUMENTS

2008/0219281 A1* 9/2008 Akin ...................... H04L 47/125
370/419

2018/0062700 A1* 3/2018 Al Rawi ............ H04L 25/03006
2018/0083815 A1* 3/2018 Humphrey .............. H04L 27/34

FOREIGN PATENT DOCUMENTS

WO    2018/178399 A1    10/2018

OTHER PUBLICATIONS

"G.mgfast: Proposal for DOI using time and frequency intervals allocated to single line", Broadcom, T17-SG15-C-1424, Study Group 15, Jul. 1-12, 2019, pp. 1-4.
"G.mgfast: Discontinuous Time-Frequency Operation (DTFO)", Broadcom Corporation, Q4/15-C8 (190923), Study Group 15, Sep. 23-27, 2019, pp. 1-5.

(Continued)

*Primary Examiner* — Stella L. Woo
(74) *Attorney, Agent, or Firm* — HARNESS, DICKEY & PIERCE, P.L.C.

(57) ABSTRACT

Example embodiments describe means (200) for performing i) pre-compensating (210, N sets of $K_1$ tone data values (220) for crosstalk between N communication lines; the N sets of $K_1$ tone data values pertaining to respective N terminal nodes of a digital communication system; ii) calculating (215) from the pre-compensated N sets of $K_1$ tone data values (221) N sets of first time domain symbols (225); iii) calculating (283) a second time domain symbol (284) from a set of $K_2$ tones values (280); the $K_2$ tone data values pertaining to a selected one of the N terminal nodes; and iv) adding (212) the second time domain symbol in a weighted manner to the first time domain symbols such that the second time domain symbol is added to the first time domain symbol for the selected terminal node and to at least one other of the first time domain symbols for the respective other terminal nodes.

17 Claims, 4 Drawing Sheets

(56) References Cited

OTHER PUBLICATIONS

Alkhateeb et al., "Frequency Selective Hybrid Precoding for Limited Feedback Millimeter Wave Systems", IEEE Transactions on Communications, vol. 64, No. 5, May 2016, pp. 1801-1818.
Sohrabi et al., "Hybrid Analog and Digital Beamforming for mmWave OFDM Large-Scale Antenna Arrays", IEEE Journal on Selected Areas in Communications, vol. 35, No. 7, Jul. 2017, pp. 1432-1443.
Extended European Search Report received for corresponding European Patent Application No. 20154975.5, dated Apr. 28, 2020, 7 pages.

* cited by examiner

DISCONTINUOUS TIME-FREQUENCY OPERATION

TECHNICAL FIELD

Various example embodiments relate, amongst others, to an apparatus for generating time domain symbols for time synchronized transmission over communication lines.

BACKGROUND

In a wired network access communication system such as a Digital Subscriber Line, DSL, communication system, a plurality of communication lines connect an access node, sometimes referred to as distribution point unit, DPU, with remote terminal nodes, sometimes referred to as customer premises equipment, CPE. By using discrete multi-tone modulation, DMT, the data intended for provision to a terminal node is first encoded into frequency domain symbols which are multiplexed onto K different frequency sub-carriers, also referred to as tones. These K frequency domain symbols each corresponding to a different tone, also referred to as tone data values, are then converted to a single time domain symbol for further transmission over the communication line to the respective terminal node. Crosstalk between the different communication lines may cause unwanted interference, i.e. disturb the transmitted time domain symbols. Crosstalk may be mitigated by pre-compensating the useful communication signals for the respective terminal nodes before transmission. The so-obtained pre-compensated communication signals are then jointly transmitted to the respective terminal nodes. This technique is also referred to as vectoring.

Vectoring is a computationally intensive process for which cost and power increases with the number of communication lines and number of tones. A technique for reducing the computational requirements is discontinuous time-frequency operation, DTFO. When using DTFO, the available tones are divided into two sets of size K1 and K2, respectively. All terminal nodes may use the set of K1 tones for data transmission, while only a single selected terminal node can use the set of K2 tones for data transmission. This way, full vectoring is only required on a subset of tones, i.e., only on $K_1 < K$ tones, while the data-rate of the selected terminal node can be boosted by also using the set of K2 tones.

SUMMARY

Amongst others, it is an object of embodiments of the invention to provide a DTFO implementation that provides a high data rate while keeping the needed computational resources low.

This object is achieved, according to a first example aspect of the present disclosure, by an apparatus comprising means for performing:
  pre-compensating N sets of $K_1$ tone data values for crosstalk between N communication lines; the N sets of $K_1$ tone data values pertaining to respective N terminal nodes of a digital communication system;
  calculating from the pre-compensated N sets of $K_1$ tone data values N sets of first time domain symbols;
  calculating a second time domain symbol from a set of $K_2$ tones values; the $K_2$ tone data values pertaining to a selected one of the N terminal nodes;
  adding the second time domain symbol in a weighted manner to the first time domain symbols such that the second time domain symbol is added to the first time domain symbol for the selected terminal node and to at least one other of the first time domain symbols for the respective other terminal nodes.

The second time domain symbol is thus not only added to the first time domain symbol for the selected terminal node but also to at least one of the first time domain symbols for the other terminal nodes. Although no vectoring operation is needed for the $K_2$ tone data values, i.e. no pre-compensation needs to be applied to the $K_2$ tone data values, a time domain shaping of the transmit symbols in the frequency band of the $K_2$ tones is achieved by the weighting operation. This shaping is further independent from the frequency band represented by the other $K_1$ tones. As a result, when adding the second weighted time domain symbols to the first time domain symbols, a time domain beamforming to the selected terminal node is achieved within the frequency band represented by the $K_2$ tones which boosts the data-rate of the selected terminal node without further affecting the other terminal nodes. Advantageously, all the above steps are performed digitally, i.e. in the digital domain before a further digital to analogue conversion. Moreover, the time domain beamforming requires only memory for up to $N^2$ weighting coefficients for the $K_2$ tones, while (frequency domain) full vectoring requires memory for up to $K_2 \times N^2$ coefficients for the $K_2$ tones.

The adding in a weighted manner may be performed by adding or subtracting the second time domain symbol from the first time domain symbols. The amount of adding or subtracting, i.e. the weighted manner, may relate to applying a discrete or continuous phase shift, or to applying a multiplication with a single real-valued or complex-valued scalar. In other words, the adding in a weighted manner may be performed according to weighting coefficients.

According to example embodiments, the means are further configured for selecting the selected one of the N terminal nodes based on throughput requirements. For example, a terminal node with a highest throughput requirement may be selected.

According to example embodiments, the means can be further configured for selecting the weighting coefficients based on the selected one of the N terminal nodes. In other words, depending on the selected terminal node, a different set of weighting coefficients is selected. Sets of weighting coefficients associated with the respective terminal nodes may for example be stored in a lookup table and selected therefrom. Alternatively, weighting coefficients may be determined according to a predetermined ruleset or derived from a subset of common weighting coefficients.

According to example embodiment, weighting coefficients are selected from one of the groups comprising {0; 1}; {1; −1}; or {1}. In other words, the second time domain symbol may be added to a first time domain symbol or subtracted from one or more of the first time domain symbols. By using these weighting coefficients, complex scaling circuitry is avoided and only adding or sign switching circuitry is needed. Further, all weighting coefficients may be equal, for example equal to 1. This way, the weighting coefficients are the same for all selected terminal nodes.

According to example embodiments, the second time domain symbol is complex and the means are further configured for performing adding according to complex weighting coefficients. In other words, the conversion of the $K_2$ tone data values from the frequency to the time domain is performed by complex numbers. This way, the weighting coefficients may also be complex thereby achieving a greater flexibility in weighting. For example, the weighting coefficients may be selected such that a rotation of the second time domain symbol is performed in the complex plane. The complex weighting coefficients may for example be selected from the group comprising 1, −1, j and −j.

According to example embodiments the means are further configured for calculating the N sets of first time domain symbols by performing a frequency to time domain conversion and an upsampling. As the $K_1$ tone data values are only a subset of the tones that are included in the transmitted time domain symbol, there is no need to perform a full resolution frequency to time domain conversion, i.e., from $K_1$ tone data values to $2(K_1+K_2)$ time domain values. The calculation of this conversion is therefore simplified by first performing a conversion with an accuracy according to the $K_1$ tone data values, resulting into $2K_1$ time domain symbols, followed by an upsampling with factor $(K_1+K_2)/K_1$, resulting into the final $2(K_1+K_2)$ time domain values.

According to example embodiments, the means are further configured for adding the second time domain symbol in a weighted manner by performing a bit shifting operation on the second time domain symbol, by performing a sign switching operation on the second time domain symbol, and/or by performing a swapping between a real and imaginary component of the second time domain symbol such that a weighting is achieved and adding the shifted, sign switched, and/or swapped second time domain symbol to the respective one of the first time domain symbols. Digital time domain values may be weighted by a bit shifting operation. For example, for complex weighting coefficients, a weighting by 1, −1, j and −j may be achieved by such bit shifting operations.

In another embodiment the means comprises at least one processor; and at least one memory including computer program code, the at least one memory and computer program code configured to, with the at least one processor, cause the apparatus to perform:
  pre-compensating N sets of $K_1$ tone data values for crosstalk between N communication lines; the N sets of $K_1$ tone data values pertaining to respective N terminal nodes of a digital communication system;
  calculating from the pre-compensated N sets of $K_1$ tone data values N sets of first time domain symbols;
  calculating a second time domain symbol from a set of $K_2$ tones values; the $K_2$ tone data values pertaining to a selected one of the N terminal nodes;
  adding the second time domain symbol in a weighted manner to the first time domain symbols such that the second time domain symbol is added to the first time domain symbol for the selected terminal node and to at least one other of the first time domain symbols for the respective other terminal nodes.

According a second example aspect, a second apparatus is disclosed comprising means for performing:
  calculating the weighting coefficients for use in the apparatus according to the first example aspect; and
  providing the weighting coefficients to the apparatus according to the first example aspect.

According to a third example aspect, the disclosure relates to an access node for a telecommunication network comprising the apparatus according to the first and/or second example aspect.

According to a fourth example aspect, the disclosure relates to a method comprising the steps of:
  pre-compensating N sets of $K_1$ tone data values for crosstalk between N communication lines; the N sets of $K_1$ tone data values pertaining to respective N terminal nodes of a digital communication system;
  calculating from the pre-compensated N sets of $K_1$ tone data values N sets of first time domain symbols;
  calculating a second time domain symbol from a set of $K_2$ tones values; the $K_2$ tone data values pertaining to a selected one of the N terminal nodes;
  adding the second time domain symbol in a weighted manner to the first time domain symbols such that the second time domain symbol is added to first time domain symbol for the selected terminal node and to at least one other of the first time domain symbols for the respective other terminal nodes.

According to a fifth example aspect, the disclosure relates to a computer program product comprising computer-executable instructions for causing an apparatus to perform at least the following:
  pre-compensating N sets of $K_1$ tone data values for crosstalk between N communication lines; the N sets of $K_1$ tone data values pertaining to respective N terminal nodes of a digital communication system;
  calculating from the pre-compensated N sets of $K_1$ tone data values N sets of first time domain symbols;
  calculating a second time domain symbol from a set of $K_2$ tones values; the $K_2$ tone data values pertaining to a selected one of the N terminal nodes;
  adding the second time domain symbol in a weighted manner to the first time domain symbols such that the second time domain symbol is added to the first time domain symbol for the selected terminal node and to at least one other of the first time domain symbols for the respective other terminal nodes.

BRIEF DESCRIPTION OF THE DRAWINGS

Some example embodiments will now be described with reference to the accompanying drawings.

DETAILED DESCRIPTION OF EMBODIMENT(S)

Figure 1:
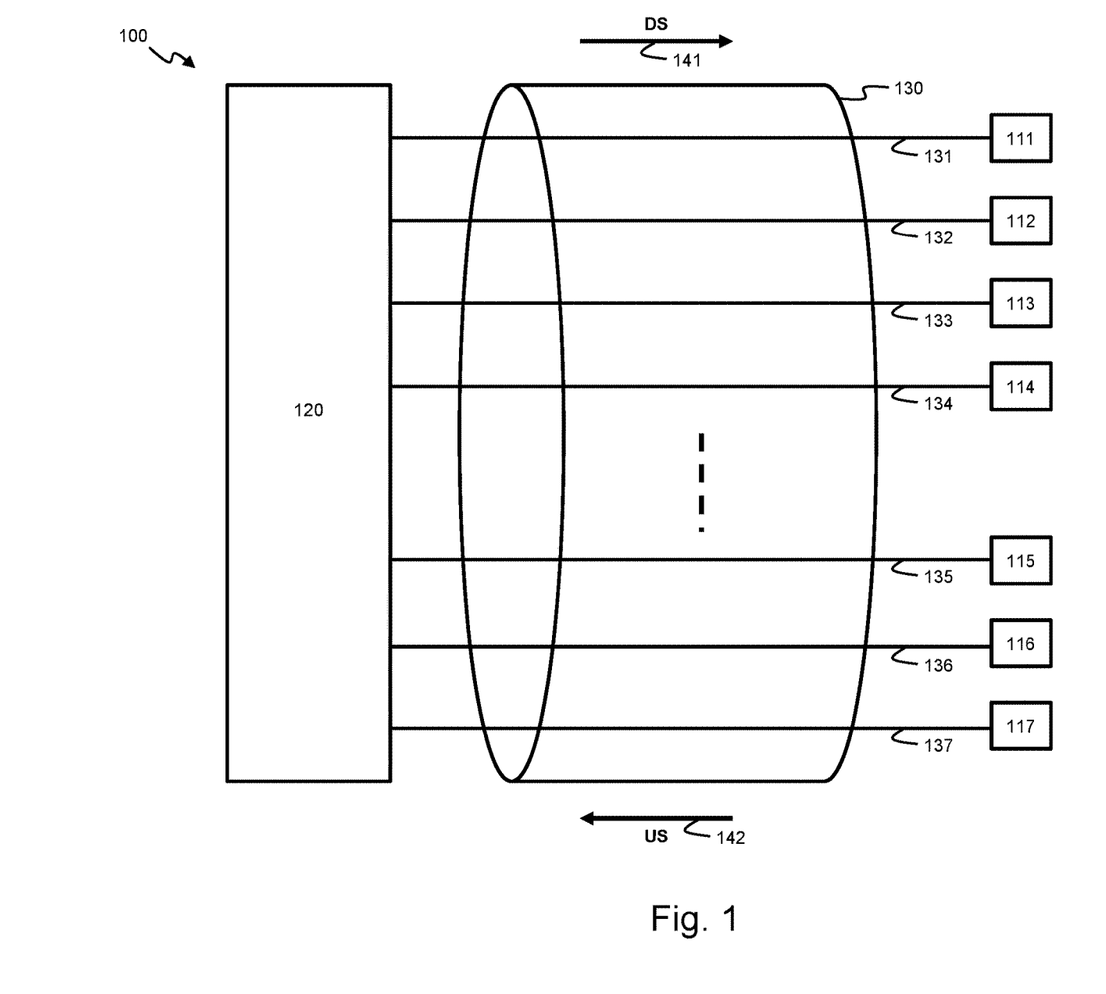
FIG. 1 shows an example embodiment of a telecommunication network comprising terminal nodes connected to an access node by respective communication lines.

Example embodiments of the present disclosure relate to the calculation of time domain symbols from tone data values for further transmission onto communication lines of a telecommunication network. FIG. 1 shows an example embodiment of such a telecommunication network 100 wherein an access node 120 connects to a plurality of N terminal nodes 111 to 117 over respective communication lines 131 to 137. Terminal nodes 111 to 117 may be located at a client side near the customer premises. Network communication from the access node towards the terminal nodes 111 to 117 is also referred to as downstream, DS, communication 141. Network communication from the terminal nodes 111 to 117 towards the access node 120 is also referred to as upstream, US, communication 142. Telecommunication network 100 uses discrete multi-tone modulation (DMT), to first encode digital data into frequency domain symbols which are multiplexed onto different frequency sub-carriers or tones. These frequency domain symbols each corresponding to a different tone, also referred to as tone data values, are then converted to a time domain symbol for further transmission over a respective one of the communication lines 131-137 to a respective one of terminal nodes 111-117. To this respect, telecommunication network 100 may be referred to as a digital subscriber line, abbreviated by DSL, telecommunication network.

Crosstalk channels between the different communication lines 131-137 may be present, because, for example, different lines are bundled together in a cable bundle or binder 130 over at least part of the trajectory between the access node 120 and terminal nodes 111-117. The crosstalk channels cause unwanted interference, i.e. a time domain symbol transmitted from the access node 120 to one of the terminal nodes 111-117 may be disturbed by other time domain symbols transmitted from the access node 120 to the other terminal nodes. Because of this, the time domain symbol received at a terminal node will also comprise portions of the other time domain symbols. Such interference is also referred to as far end crosstalk, FEXT. Crosstalk may be mitigated by pre-compensating the communication signals for the respective terminal nodes before transmission by the anticipated crosstalk. The so-obtained pre-compensated communication signals are then jointly transmitted to the respective terminal nodes. This technique is also referred to as vectoring.

Vectoring is a computationally intensive process for which cost and power increases with the number of communication lines and number of tones. One technique for reducing the computational requirements is discontinuous time-frequency operation, DTFO. When using DTFO, the available tones are divided into two sets of size K1 and K2, respectively. All terminal nodes 111-117 may use the set of K1 tones for data transmission, whereas only a selected one of the terminal nodes 111-117 can use the set of K2 tones for data transmission. This way, full vectoring is only required on a subset of tones, i.e., only on $K_1 < K$ tones, while the data-rate of the selected terminal node can be boosted by also using the set of K2 tones.

The below example embodiments describe, among others, means and circuitries for calculating time domain symbols according to such a discontinuous time-frequency operation, DTFO, mode. Embodiments according to the present disclosure may be used in telecommunication systems operating according to telecommunication protocols supporting DTFO, for example according to the recommendations defined by the ITU-T project G.mgfast.

Figure 2:
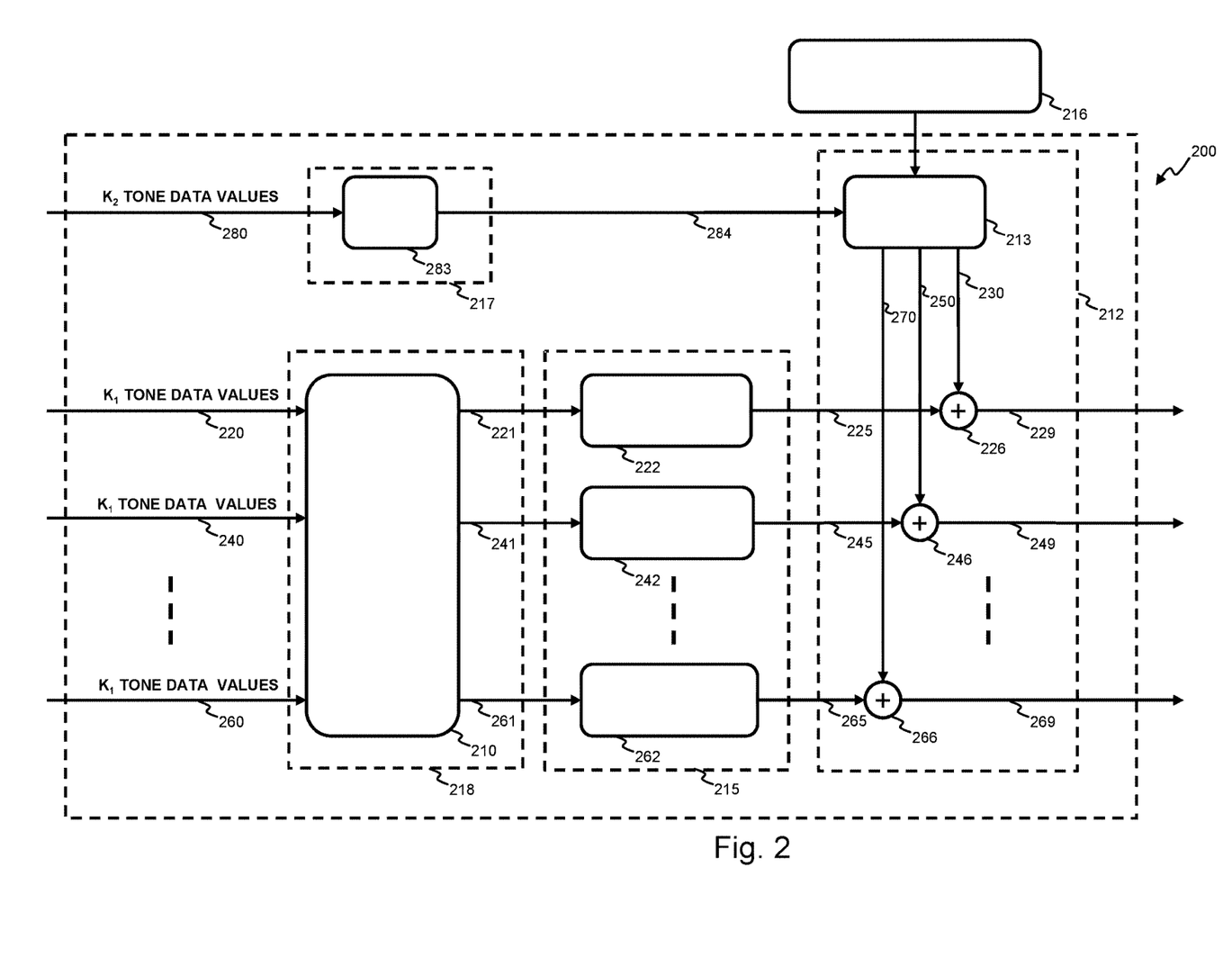
FIG. 2 shows an example embodiment of an apparatus for calculating time domain symbols from tone data for transmission onto communication lines.

FIG. 2 shows example embodiment of an apparatus 200 for calculating N time domain symbols 229, 249 . . . 269 from tone data for transmission onto N communication lines. To this end, apparatus 200 may be included in an access node 120. In the embodiment depicted in FIG. 1, apparatus 200 comprises several depicted functional blocks, hereafter also described as "circuitry". In other embodiments all functions of the apparatus can all be performed by one single processor, or other combinations of functional units performed by e.g. co-operating processing modules. In general the apparatus comprises means (217, 218, 215, 212) for receiving N sets of K1 tone data values, for receiving a set of K2 tone data values, for pre-compensating N sets of $K_1$ tone data values for crosstalk between N communication lines, calculating from the pre-compensated N sets of $K_1$ tone data values N sets of first time domain symbols, calculating a second time domain symbol from the set of $K_2$ tones values, adding the second time domain symbol in a weighted manner to the first time domain symbols such that the second time domain symbol is added to the first time domain symbol for the selected terminal node and to at least one other of the first time domain symbols for the respective other terminal nodes, and providing the N time domain communication symbols to an output of the apparatus.

The embodiment of FIG. 2 comprises a further circuitry 210 configured to pre-compensate N sets of $K_1$ tone data values 220, 240, 260 for crosstalk between the N communication lines. The N sets of $K_1$ tone data values relate to respective N terminal nodes connected to the N communication lines in a digital communication system, e.g. nodes 111-117 of telecommunication system 100. The $K_1$ tones are a subset of a total amount of K tones wherein $K=K_1+K_2$. The $K_2$ other tones are reserved for a selected one of the terminal nodes. To this end, apparatus 200 also receives a single set of $K_2$ tone data values 280 for the selected one of the N terminal nodes.

Each tone value may be the result of a preceding bit loading operation during which a certain amount of data bits are loaded onto the respective tone. The number of data bits that are loaded onto a certain tone may be dependent on the channel conditions of the communication line. The number of bits that are loaded onto a certain tone may also be the same for all $K_1$ and/or $K_2$ tone data values. A tone value may be represented by an in-phase, I, and quadrature, Q, component. Each component may then be digitally represented by a binary value.

The $K_1$ tone data values may be associated with a first frequency band $B_1$ available in a communication channel between the access node and respective terminal nodes. The $K_2$ tone data values may be associated with a second other frequency band $B_2$ available in this communication channel. The first frequency band $B_1$ may be lower than this second frequency band $B_2$, i.e. the first frequency band corresponds to a lower band and the second frequency band to a higher band. In a telecommunication system according to the G.mgfast recommendation, the total available number of tones may range from K=2048 to K=8192 or even up to K=16384. The following selection may then be made for frequency bands $B_1$ and $B_2$:

$B_1$=up to 106 MHz, $B_2$=106-212 MHz;
$B_1$=up to 106 MHz, $B_2$=106-424 MHz;
$B_1$=up to 212 MHz, $B_2$=212-424 MHz;
B1=up to 212 MHz, $B_2$=212-848 MHz;
B1=up to 424 MHz, $B_2$=424-848 MHz.

Circuitry 210 calculates N sets of $K_1$ pre-compensated tone data values 221, 241 . . . 261 from the N sets of K1 tones values 220, 240 . . . 260. Apparatus 200 further comprises a circuitry 215 for converting the N sets of K1 pre-compensated tone data values 221, 241 . . . 261 to respective N sets of digital time domain symbols 225, 245 . . . 265. Similarly, apparatus 200 comprises a circuitry 283 for converting the single set of K2 tone data values 280 into a single digital time domain symbol 284. A digital time domain symbol is a consecutive series of digital values representing a time-varying communication signal that is to be transmitted onto one of the communication lines.

Apparatus 200 further comprises a circuitry 212 that is configured to add the time domain signal 284 to the respective N time domain symbols 225, 245 . . . 265 in a weighted manner. In a weighted manner may be understood as that the circuitry 212 is further configured to i) add the time domain symbol 284 to the one of the time domain symbols 225, 245 . . . 265 that pertains to same terminal node, i.e. the terminal node for which the data bits loaded onto the $K_2$ tone data values is destined; and to ii) add the time domain symbol 284 to at least one other of the time domain symbols 225, 245 . . . 265. In case there is no boosting applied for a selected terminal node, no addition may be performed at all, i.e. steps i) and ii) are skipped.

According to an example embodiment, circuitry 212 may further comprise N adder circuitries 226, 246 . . . 266 for adding N weighted time domain symbols 230, 250 . . . 270 to the respective N time domain symbols 225, 245 . . . 265. Circuitry 212 then further comprises a weighting circuitry 213 that is configured to weight the time domain symbol 284 according to N weighting coefficients thereby producing the N weighted time domain symbols 230, 250 . . . 270.

The so-obtained N digital time domain symbols 229, 249 . . . 269 may then be further processed in a transmission pipeline for transmission onto N respective communication lines to the N respective terminal nodes. By the weighted addition of the time domain symbol 284, an improved delivery of the symbol to the selected terminal node is achieved while keeping the processing and memory requirements to a minimum. The circuitry 212 has the effect that a beamforming effect is achieved towards the selected terminal node within the frequency band corresponding to the $K_2$ tone data values. Furthermore, the pre-compensating circuitry 210 and conversion circuitries 222, 242 . . . 262 are independent from the signal 284, i.e. these circuitries' processing requirements are only based on the $K_1$ tone data values.

The weighting coefficients used by circuitry 213 may be different for each selected terminal node, i.e. for each selected terminal node a different set of N weighting coefficients are needed. These different sets may be stored locally in circuitry 213, for example in a lookup-table wherein circuitry 213 retrieves the set of N applicable weighting coefficients based on an identification of the selected terminal node. The weighting circuitries may also be directly provided by another circuitry 216. Or, this circuitry 216 may update the weighting coefficients stored in the lookup-table from time to time, e.g. when the weighting coefficients have changed.

The weighting coefficients may further be determined by circuitry 216 by globally optimizing the coefficients for a maximum data throughput for each of the selected terminal nodes. In FIG. 2 this circuitry is depicted as not forming part of the apparatus 200. In other embodiments this circuitry can be part of the apparatus.

For this determination of the weighting coefficients, a locally-optimal approach may be followed wherein the best coefficient is determined for one line while keeping the other coefficients constant. When the optimal coefficient for this line is found, the circuitry 216 proceeds to a next iteration wherein the best coefficient is determined for a next communication line. The circuitry may repeat such iteration several times over all communication lines until a convergence is reached.

In an embodiment circuitry 216 may correspond to a vectoring control entity, VCE, which is also not part of apparatus 200. Such a vector controlling entity may be configured to determine the vectoring coefficients for use in circuitry 210 for the pre-compensation of the tone data values 220, 240 . . . 260. These vectoring coefficients may be derived from a channel estimation, i.e. an estimation of cross-talk channels between the N communication lines for the $K_1$ tones. Such vectoring control entity receives performance measurements from the remote terminal nodes for deriving the vectoring coefficients. Likewise, the VCE may also retrieve performance measurements on the $K_2$ tones from the selected terminal node. Alternatively, the VCE may also derive the weighting coefficients from channel measurements on the $K_2$ tones of the communication lines.

Determining the selected terminal node from the N terminal nodes may be done by the dynamic resource allocation (DRA) component and may be based on different metrics such as the throughput requirements of the terminal nodes. The node with the highest throughput requirement may then be selected as the selected node and have its data-rate boosted. Throughput requirements may be further based on physical metrics such as the actual instantaneous throughput or a throughput demand from the terminal nodes. Throughput requirements may also be based on economic metrics such as a subscription model wherein users may pay extra for having their data rate boosted. Selection of the selected terminal node may vary in time, for example on a symbol by symbol basis, such that several terminal node may benefit from a boosted data rate.

Figure 3:
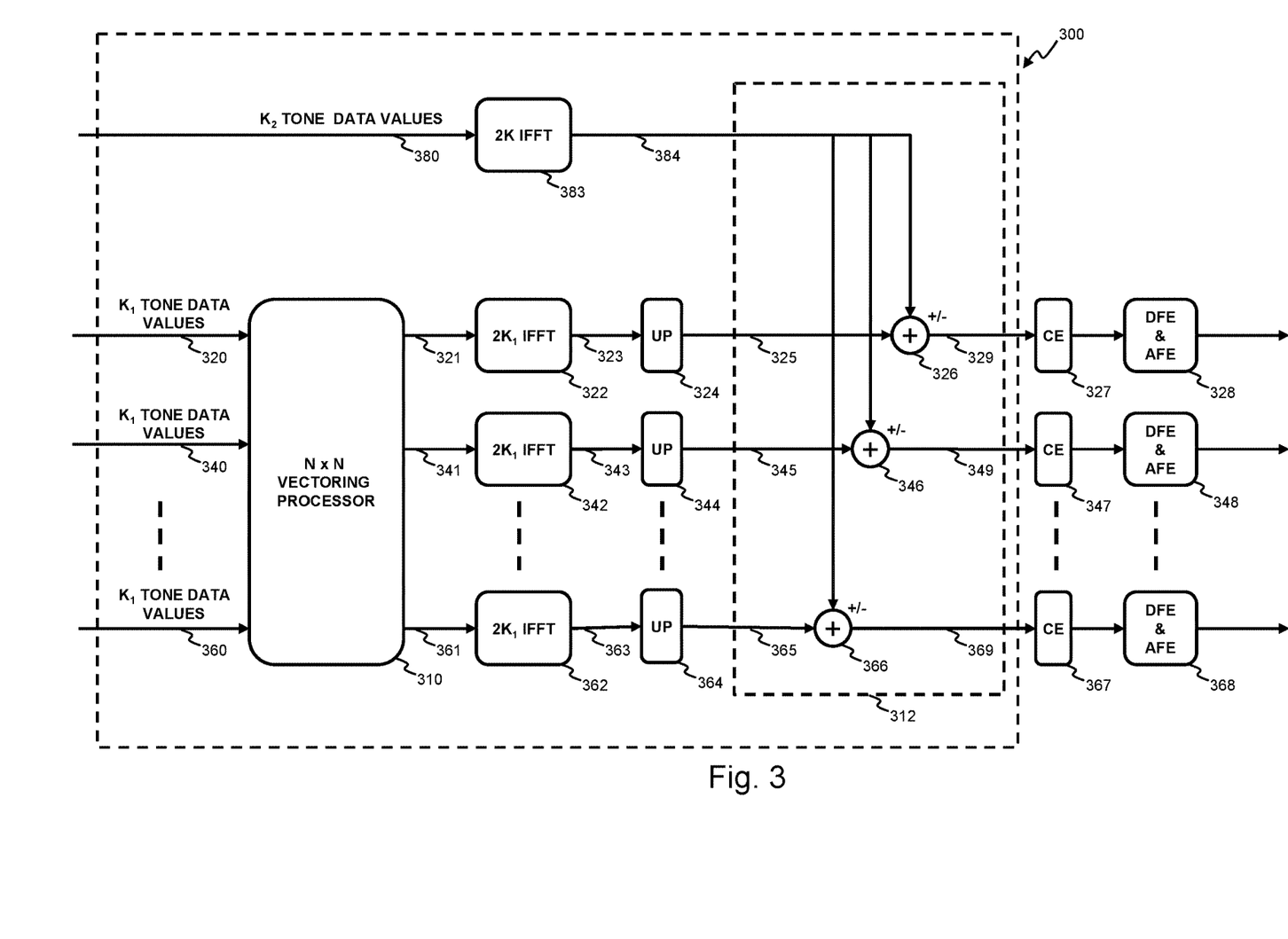
FIG. 3 shows a further example embodiment of an apparatus for calculating time domain symbols from tone data for transmission onto communication lines.

FIG. 3 illustrates a further embodiment 300 of the above described apparatus 200. Circuitry 210 is further embodied as an N×N vectoring processor 310 for pre-compensating the N sets of $K_1$ tone data values 320, 340 . . . 360 for crosstalk thereby obtaining the N sets of K1 pre-compensated tone data values 321, 341 . . . 361. Frequency to time domain conversion circuitries 222, 242 . . . 262 are further embodied by a respective first circuitry 322, 342 . . . 362 that applies a 2 times $K_1$ point inverse fast Fourier transform, IFFT, to obtain respective time domain symbols 323, 343 . . . 363. To ensure real-valued time domain symbols, such a $2K_1$-point IFFT operation includes a mirror copy of the $K_1$ complex-valued pre-compensated tone data values, resulting in $2K_1$ IFFT input values with a complex conjugate symmetric structure. These symbols 323, 343 . . . 363 are then upsampled by respective upsampling circuitries 324, 344 . . . 364 according to an upsampling factor of $(K_1+K_2)/K_1$ thereby obtaining digital time domain symbols 325, 345 . . . 365 having 2 times K, 2K, time values. Similarly, circuitry 300 comprises an IFFT circuitry 383 as further embodiment of circuitry 283. IFFT circuitry 383 is further configured to calculate a 2 times K point IFFT on 2K input values, which are formed as follows:

1) the first K1 entries are zeros, corresponding to the frequency band having the K1 tones;
2) The next K2 entries are the K2 tone data values 380, corresponding to the frequency band having the K2 tones for the selected terminal node;
3) The second K entries are a mirror copy of the first K entries, corresponding to a complex conjugate symmetric band, thereby obtaining the time domain symbol 384 having 2 times K, 2K, time values. The time domain symbol 384 is then either added to or subtracted from the respective time domain symbols 325, 345 . . . 365, i.e. the time symbol 384 is first weighted by a weighting coefficient with value 1 or −1 and then added by adding circuitry 326, 346 . . . 366. The subtraction may for example be performed by a digital sign switching circuitry. The so-obtained time domain symbols 329, 349 . . . 369 may then be further processed by further circuitries of the transmission pipeline, e.g. by adding a cyclic extension by respective circuitries 327, 347 . . . 367, and by digital and analogue front ends, DFEs and AFEs, 328, 348 . . . 368. Certain tones may further be dropped during frequency domain processing by means of loading said tones with a zero-valued frequency symbol, e.g. the tone associated with the zero frequency, DC, and Nyquist frequency.

The frequency-domain representation of the communication signal received from a circuitry 300 by the selected terminal node n for a certain tone k selected from the $K_2$ tones may be written as follows:

$$y_k^n = \sum_m h_k^{n,m} D^{m,n} x_k^n + z_k^n,$$

wherein
- $y_k^n$ is the frequency-domain receive signal at the selected terminal node n on tone k;
- $h_k^{n,m}$ is the frequency-domain channel coefficient on tone k from communication line m to the communication line n, i.e. the line connecting to the selected terminal node;
- $x_k^n$ is the frequency-domain transmit symbol on tone k for communication line n;
- $D^{m,n}=\{1,-1\}$ is the time-domain weighting coefficient as applied by circuitry 313 having the same value on all tones k of the set of K2 tones. These coefficients determine whether the 2K time domain symbol 384 is added or subtracted from the 2K time domain symbols 325, 345 . . . 365.

The term time-domain thereby refers to the fact that the weighting coefficients $D^{m,n}$ are applied after the frequency to time domain conversion circuitry 383.

According to other example embodiments different time-domain beamforming schemes may be achieved by choosing other weighting coefficients. For example, weighting coefficients may be selected from the set {0, 1}, {0, 1, −1} or even all have a value 1. In the last example, the coefficients do not need to be changed upon change of the selected terminal node. The coefficients may also have a real scalar value thereby achieving a scaling of the time domain symbol 284 in circuitry 213 by performing a multiplication with the respective coefficients in circuitry 213.

Figure 4:
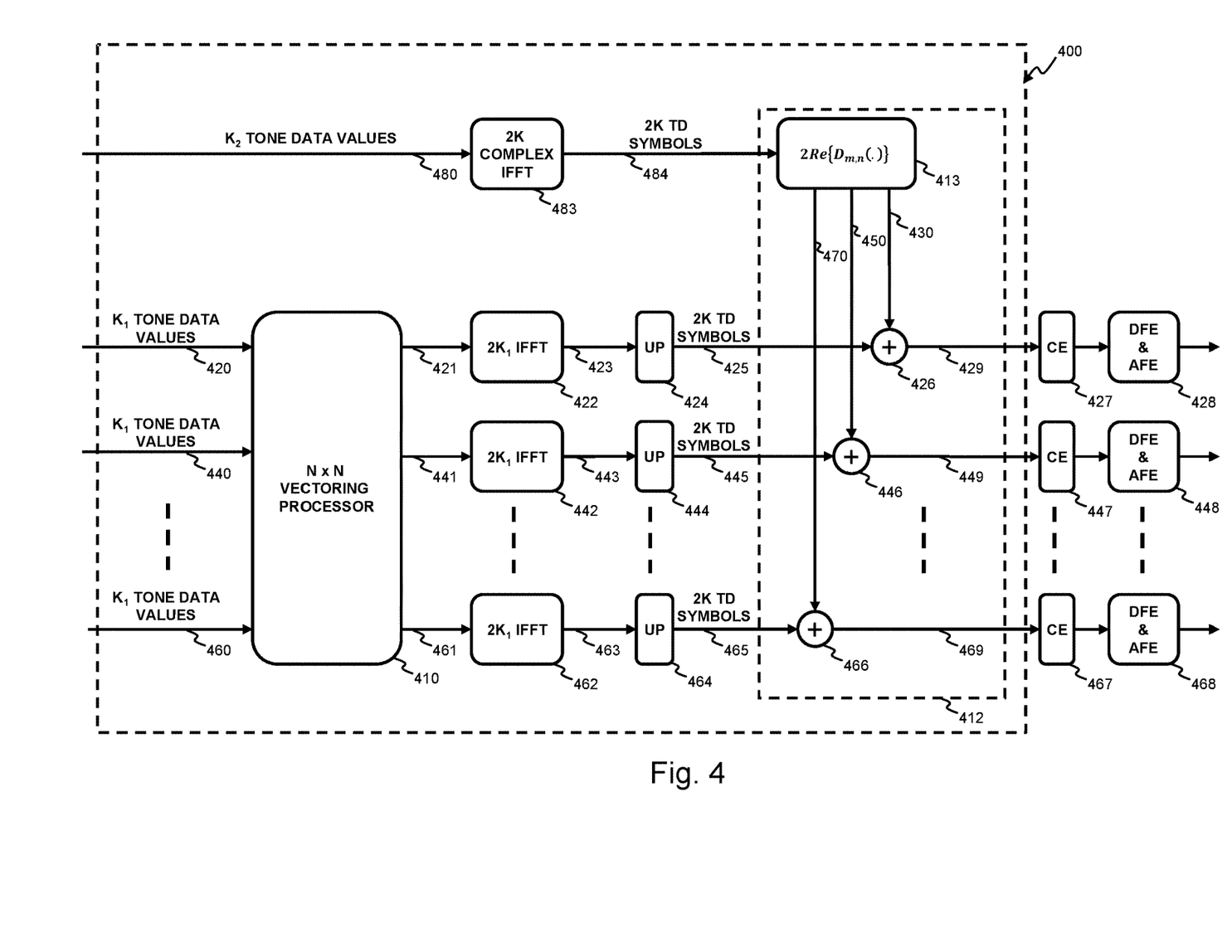
FIG. 4 shows a further example embodiment of an apparatus for calculating time domain symbols from tone data for transmission onto communication lines.

FIG. 4 illustrates a further embodiment 400 of the above described apparatus 200. Circuitry 210 is further embodied as an N×N vectoring processor 410 for pre-compensating the N sets of $K_1$ tone data values 420, 440 . . . 460 for crosstalk thereby obtaining the N sets of K1 pre-compensated tone data values 421, 441 . . . 461. Frequency to time domain conversion circuitries 222, 242 . . . 262 are further embodied by a respective first circuitry 422, 442 . . . 462 that applies a 2 times $K_1$ point inverse fast Fourier transform, IFFT, including a mirror copy of the $K_1$ pre-compensated tone data values, to obtain respective time domain symbols 423, 443 . . . 463. These symbols are then upsampled by respective upsampling circuitries 424, 444 . . . 464 according to an upsampling factor of $(K_1+K_2)/K_1$ thereby obtaining digital time domain symbols 425, 445 . . . 465 having 2 times K, 2K, time values. Circuitry 400 further comprises a complex IFFT circuitry 483 as further embodiment of circuitry 283. IFFT circuitry 483 is further configured to calculate a 2 times K point complex IFFT from the $K_2$ tone data values 480 thereby obtaining the time domain symbol 484 having 2 times K, 2K, complex time values. i.e. time values represented by complex numbers. Circuitry 413 then applies complex weighting coefficients to the complex time domain symbol 484. The so-obtained weighted complex time domain symbols values are then converted to real values by taking two times the real component of these complex values. The resulting weighted real time domain symbols 430, 450 . . . 470 are then added to the respective time domain symbols 425, 445, 465 thereby obtaining the output time domain symbols 429, 449 . . . 469. These time domain symbols may then be further processed by further circuitries of the transmission pipeline, e.g. by adding a cyclic extension by respective circuitries 427, 447 . . . 467, and by digital and analogue front ends, DFEs and AFEs, 428, 448 . . . 468.

By the embodiment of the apparatus via the shown means 400, a more general form of time-domain beamforming is obtained because this circuitry uses complex valued weighting coefficients. To achieve this, IFFT circuitry 483 calculates complex-valued time-domain symbols 484. According to an embodiment, this is done by discarding the mirror copy of the complex-valued tone data values 480. To explain this, define the real-valued symbol sequence $\{x_0, \ldots, x_{K-1}\}$ as the output of a K-point IFFT complex-valued symbol sequence $\{X_0, \ldots, X_{K-1}\}$, together with the discrete Fourier transform symmetry given by $X^*_k = X_{K-k}$, $\forall k = 1 \ldots K-1$ and $X_0 = X_{K/2} = 0$ (according to a zero-valued DC and Nyquist frequency). Then for every $l \in [0, K-1]$ the following holds:

$$x_l = IFFT_l(X_0 \ldots X_K)$$
$$= \frac{1}{K}\sum_{k=0}^{K-1} X_k e^{j2\pi\frac{kl}{K}}$$
$$= 0 + \frac{1}{K}\sum_{k=1}^{\frac{K}{2}-1} X_k e^{j2\pi\frac{kl}{K}} + 0 + \frac{1}{K}\sum_{k=\frac{K}{2}+1}^{K-1} X_k e^{j2\pi\frac{kl}{K}}$$
$$= \frac{1}{K}\sum_{k=1}^{\frac{K}{2}-1} X_k e^{j2\pi\frac{kl}{K}} + \frac{1}{K}\sum_{k'=1}^{\frac{K}{2}-1} X^*_{\frac{K}{2}-k'} e^{j2\pi\frac{(k'+\frac{K}{2})l}{K}}$$
$$= \frac{1}{K}\sum_{k=1}^{\frac{K}{2}-1} X_k e^{j2\pi\frac{kl}{K}} + \frac{1}{K}\sum_{k''=1}^{\frac{K}{2}-1} X^*_{k''} e^{j2\pi\frac{(K-k'')l}{K}}$$
$$= \frac{1}{K}\sum_{k=1}^{\frac{K}{2}-1} X_k e^{j2\pi\frac{kl}{K}} + \frac{1}{K}\sum_{k''=1}^{\frac{K}{2}-1} X^*_{k''} e^{-j2\pi\frac{k''l}{K}}$$
$$= 2\text{Re}\left\{\frac{1}{K}\sum_{k=1}^{\frac{K}{2}-1} X_k e^{j2\pi\frac{kl}{K}}\right\}$$
$$= 2\text{Re}\left\{IFFT_l\left(X_0 \ldots X_{\frac{K}{2}-1} 0 \ldots 0\right)\right\}$$

From this it follows that complex-valued time-domain beamforming may be implemented by:
1) Compute the 2K complex-valued time-domain symbols for the $K_2$ tones as $x_{K2}$ by means of a 2K-point IFFT where the input 2K frequency symbols are formed as follows:
   a) the first $K_1$ entries are zeros, corresponding to the frequency band having the $K_1$ tones;
   b) The next $K_2$ entries correspond to the frequency band having the $K_2$ tones for the selected terminal node;
   c) The second K entries are zeros, corresponding to the nullified conjugate symmetric band.
2) For every communication line m, compute the beamformed 2K real-valued time-domain symbols $x_m$ 430, 450 . . . 470 as $x_m = 2\text{Re}\{D^{m,n} x_{K2}\}$ wherein $D^{m,n}$ corresponds to the complex weighting coefficient for the communication line m.
3) For every line m, add the two corresponding 2K time-domain symbols When using complex weighting coefficients, the coefficients may be chosen such that a rotation is performed in the complex plane, i.e. by selecting the weighting coefficient as $D^{m,n} = e^{j\theta}$ and $\theta \in [0, 2\pi]$. In addition to rotating, the coefficients may also achieve a scaling, i.e. by selecting the weighting coefficient as $D^{m,n} = Ae^{j\theta}$ with A being real scalar and $\theta \in [0, 2\pi]$.

To further simplify the rotation, a set of predefined complex weighting coefficients may be selected such as for example $D^{m,n}=\{1, -1, j, -j\}$. In such case, the weighting circuitry 413 may be further simplified by implementing a combination of a bit shifting operation, a sign switching operation or a swapping operation between the real and imaginary value of the complex time domain symbol for the four multiplications with the weighting coefficients as follows:

if $D^{m,n}=1$, then $x_{i,m}=\text{bitshiftleft}(x_{i,B2}^{R})$;
if $D^{m,n}=-1$, then $x_{i,m}=\text{bitshiftleft}(\text{signchange}(x_{i,B2}^{R}))$;
if $D^{m,n}=j$, then $x_{i,m}=\text{bitshiftleft}(\text{signchange}(x_{i,B2}^{I}))$; and
if $D^{m,n}=-j$, then $x_{i,m}=\text{bitshiftleft}(x_{i,B2}^{I})$;

wherein $x_{i,B2}=x_{i,B2}^{R}+jx_{i,B2}^{I}$ is the $i^{th}$ value of complex time domain symbol 484;

$x_{i,m}=2\text{Re}(D^{m,n}x_{i,B2})$ is the $i^{th}$ value of the weighted time domain symbol 430, 450 . . . 470 for communication line m;

bitshiftleft(x) corresponds to a left shift of the value x; and
signchange(x) corresponds to a sign switch of the value x.

As used in this application, the term "circuitry" as well as "means" may refer to one or more or all of the following:

(a) hardware-only circuit implementations such as implementations in only analog and/or digital circuitry and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and/or processor(s), such as microprocessor(s) or a portion of a microprocessor(s), that requires software (e.g. firmware) for operation, but the software may not be present when it is not needed for operation.

This definition of circuitry and/or means applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. An apparatus comprising at least one processor and at least one memory including computer program code, the at least one memory and the computer program code configured to, with the at least one processor, cause the apparatus at least to perform:
   pre-compensating N sets of K1 tone data values for crosstalk between N communication lines, the N sets of K1 tone data values pertaining to respective N terminal nodes of a digital communication system;
   calculating from the pre-compensated N sets of K1 tone data values N sets of first time domain symbols;
   calculating a second time domain symbol from a set of K2 tone data values, the K2 tone data values pertaining to a selected one of the N terminal nodes; and
   adding the second time domain symbol in a weighted manner to the first time domain symbols such that the second time domain symbol is added to the first time domain symbol for the selected terminal node and to at least one other of the first time domain symbols for the respective other terminal nodes.

2. The apparatus according to claim 1 wherein the at least one memory and the computer program code are further configured to, with the at least one processor, cause the apparatus at least to further perform the adding according to weighting coefficients.

3. The apparatus according to claim 2 wherein the at least one memory and the computer program code are further configured to, with the at least one processor, cause the apparatus at least to further perform selecting the weighting coefficients based on the selected one of the N terminal nodes.

4. The apparatus according to claim 2 wherein the at least one memory and the computer program code are further configured to, with the at least one processor, cause the apparatus at least to further perform selecting the selected one of the N terminal nodes based on throughput requirements.

5. The apparatus according to claim 2 wherein the at least one memory and the computer program code are further configured to, with the at least one processor, cause the apparatus at least to further perform selecting the weighting coefficients from one of the groups:
   {0; 1};
   {1;−1}; or
   {1}.

6. The apparatus according to claim 2 wherein all weighting coefficients are equal.

7. The apparatus according to claim 2 wherein the second time domain symbol is complex and the at least one memory and the computer program code are further configured to, with the at least one processor, cause the apparatus at least to further perform adding according to complex weighting coefficients.

8. The apparatus according to claim 7 wherein the at least one memory and the computer program code are further configured to, with the at least one processor, cause the apparatus at least to further perform selecting complex weighting coefficients from a group of numbers comprising 1, −1, j and −j.

9. The apparatus according to claim 8 wherein the at least one memory and the computer program code are further configured to, with the at least one processor, cause the apparatus at least to further perform selecting complex weighting coefficients such that a rotation of the second time domain symbol is performed in the complex plane.

10. The apparatus according to claim 1 wherein the at least one memory and the computer program code are further configured to, with the at least one processor, cause the apparatus at least to further perform calculating the N sets of first time domain symbols by performing a frequency to time domain conversion and an upsampling.

11. The apparatus according to claim 1 wherein the at least one memory and the computer program code are further configured to, with the at least one processor, cause the apparatus at least to further perform adding the second time domain symbol in a weighted manner by performing at least one of a bit shifting operation on the second time domain symbol, a sign switching operation on the second time domain symbol, or a swapping between a real and imaginary component of the second time domain symbol such that a weighting is achieved; and adding at least one of the shifted, the sign switched, or the swapped second time domain symbol to the respective one of the first time domain symbols.

12. The apparatus according to claim 1, wherein said apparatus is comprised in an access node for a telecommunications network.

13. The apparatus according to claim 2, wherein said apparatus is comprised in an access node for a telecommunications network.

14. A method comprising:
pre-compensating N sets of K1 tone data values for crosstalk between N communication lines, the N sets of K1 tone data values pertaining to respective N terminal nodes of a digital communication system;
calculating from the pre-compensated N sets of K1 tone data values N sets of first time domain symbols;
calculating a second time domain symbol from a set of K2 tone data values, the K2 tone data values pertaining to a selected one of the N terminal nodes; and
adding the second time domain symbol in a weighted manner to the first time domain symbols such that the second time domain symbol is added to the first time domain symbol for the selected terminal node and to at least one other of the first time domain symbols for the respective other terminal nodes.

15. The method according to claim 14 further comprising performing the adding according to weighting coefficients.

16. A non-transitory computer readable medium comprising program instructions for causing an apparatus to perform at least the following:
pre-compensating N sets of K1 tone data values for crosstalk between N communication lines, the N sets of K1 tone data values pertaining to respective N terminal nodes of a digital communication system;
calculating from the pre-compensated N sets of K1 tone data values N sets of first time domain symbols;
calculating a second time domain symbol from a set of K2 tone data values, the K2 tone data values pertaining to a selected one of the N terminal nodes;
adding the second time domain symbol in a weighted manner to the first time domain symbols such that the second time domain symbol is added to the first time domain symbol for the selected terminal node and to at least one other of the first time domain symbols for the respective other terminal nodes.

17. A non-transitory computer readable medium comprising program instructions stored thereon for performing at least the following:
pre-compensating N sets of K1 tone data values for crosstalk between N communication lines, the N sets of K1 tone data values pertaining to respective N terminal nodes of a digital communication system;
calculating from the pre-compensated N sets of K1 tone data values N sets of first time domain symbols;
calculating a second time domain symbol from a set of K2 tone data values, the K2 tone data values pertaining to a selected one of the N terminal nodes; and
adding the second time domain symbol in a weighted manner to the first time domain symbols such that the second time domain symbol is added to the first time domain symbol for the selected terminal node and to at least one other of the first time domain symbols for the respective other terminal nodes.

\* \* \* \* \*